United States Patent [19]
Kim

[11] Patent Number: 5,290,050
[45] Date of Patent: Mar. 1, 1994

[54] COLLAPSIBLE BASKET STRUCTURE

[76] Inventor: Jeong Ki Kim, 66 Baker Rd., Livingston, N.J. 07039

[21] Appl. No.: 938,424

[22] Filed: Aug. 31, 1992

[51] Int. Cl.⁵ .......................... B62B 3/02; E04H 15/18
[52] U.S. Cl. ........................................ 280/42; 52/109; 52/646; 220/6; 280/651; 280/47.34
[58] Field of Search ............... 52/109, 143, 645, 646; 220/6, 8, 408; 280/42, 651, 652, 638, 639, 654, 655, 47.34

[56] References Cited

U.S. PATENT DOCUMENTS

| | | |
|---|---|---|
| 250,205 | 11/1881 | Collins . |
| 609,491 | 8/1898 | Ashwell . |
| 2,020,766 | 11/1935 | Brown . |
| 2,553,703 | 11/1947 | Ebersole . |
| 2,574,610 | 11/1951 | Aarestad . |
| 2,764,764 | 8/1953 | Savage, Jr. . |
| 3,605,139 | 9/1971 | Lorentz, Jr. . |
| 4,186,454 | 2/1980 | Cone . |
| 4,202,065 | 5/1980 | Sullivan . |
| 4,276,726 | 7/1981 | Derus . |
| 4,599,832 | 7/1986 | Benton . |
| 4,739,527 | 4/1988 | Kohus et al. . |
| 4,779,635 | 10/1988 | Lynch .............................. 52/109 X |
| 4,947,884 | 8/1990 | Lynch .............................. 52/109 X |
| 5,038,532 | 8/1991 | Shahinpoor ...................... 52/646 X |

Primary Examiner—David M. Mitchell
Assistant Examiner—Michael Mar
Attorney, Agent, or Firm—Thomas R. Morrison

[57] ABSTRACT

A shopping basket is comprised of an arrangement of plural lazytongs frames movable from folded to extended position in which they constitute an erected structure having a floor provided by support bars, these support bars including long bars and short bars connected to the lower part of the enclosure. By selectively adjusting the effective lengths of the long support bars, the envelope and hence capacity of the erect structure can be changed. The structure can embody wheels and a handle thereon so that the basket serves as a readily movable shopping cart.

19 Claims, 6 Drawing Sheets

COLLAPSIBLE BASKET STRUCTURE

BACKGROUND OF THE INVENTION

The present invention relates to a collapsible basket structure and, more particularly, to a collapsible structure readily erected from collapsed condition to a fully erected condition which optionally can be made to be any one of a number of erect basket sizes or capacities set at the selection of the user, the structure being lockable in a selected such erect condition.

Various constructions of readily collapsible readily erectable structures are known, these constructions commonly employing articulated arm arrangements, lazytongs frames or like foldable expandable elements which are movable in a certain manner to form the structure. Most such constructions involve plural and sometimes complicated manipulations of the structure to effect erection or folding. Another drawback with these known structures is that in some instances a single size capacity of, e.g., a collapsible type shopping cart, can be too large of too small for the user's need or convenience. On the one hand, the cart cannot hold all the user wants to purchase, while on the other hand, the erect size of the cart is unnecessary in relation to the small volume of what is to be carried with the added disadvantage of being cumbersome to handle in terms of the then present use need. Further, shape and bulk of certain objects to be carried suggests that capability of changing a basket size and capacity can be advantageous.

OBJECTS AND SUMMARY OF THE INVENTION

Accordingly, it is an object of the invention to provide a readily collapsible readily erectable structure such as a shopping basket which overcomes the drawbacks of the prior art.

It is a further object of the invention to provide a readily collapsible readily erectable structure useable, for example, as a basket, the structure optionally being readily adjustable so its erected structure capacity is varied this being by selectively adjusting the effective length of certain of arms in the structure.

Another object is to provide a readily collapsible readily erectable structure wherein the erect structure can have a variety of plan expanse area geometries such as triangular, rectangular or other polygonal shape.

It is a still further object of the invention to provide a variable capacity readily erectable structure which is particularly suited for use as a shopping cart by equipping the structure with wheels and a handle.

Briefly stated, there is provided a structure comprised of an arrangement of plural lazytongs frames movable from folded to extended position in which they constitute an erected enclosure structure having a floor provided by support bars, these support bars including long arms and short arms connected to the lower part of the enclosure. By selectively adjusting the effective lengths of the long support bars, the envelope and hence, capacity of the erect structure can be changed. The structure can embody wheels and a handle thereon so that the basket serves as a readily movable shopping cart.

In accordance with these and other objects of the invention, there is provided a structure erectable from a folded condition thereof to an erected condition wherein the structure presents an upright enclosure having a plurality of sides and a floor supported from a lower part of the enclosure. The structure comprises a corresponding plurality of lazytongs frames connected each at both of opposite frame sides to another one of said lazytongs frames so that extension of any one lazytongs frame from a retracted to extended position causes extension of the other lazytongs frames, the extended lazytongs frames defining the enclosure. The enclosure floor comprises a plurality of support bars, the bar plurality including longer support bars and shorter support bars. A first end of each longer support bar is connected to the enclosure lower part at the location where a lazytongs frame side is connected to an adjacent lazytongs frame side. A first end of each shorter support bar is connected to the enclosure lower part at a location intermediate the opposite sides of a lazytongs frame, a second opposite end of each longer support bar and a second opposite end of each shorter support bar being connected to a hub fitting about which all of the support bars radially array with the enclosure in erect condition. The shorter support bars are telescopic members which telescopically adjust in length during erection and folding of the structure responsive to the fact that a distance to the intermediate location of a frame side from an enclosure center is shorter than that from the center to an enclosure corner.

In another aspect, the invention provides a structure erectable from a folded condition thereof to an erected condition wherein the structure presents an upright rectangular enclosure and a floor supported from a lower part of the enclosure. The structure comprises four lazytongs frames connected each at both of opposite frame sides to another one of said lazytongs frames so that extension of any one lazytongs frame from a retracted to extended position causes extension of the other lazytongs frames. The enclosure floor comprises a plurality of support bars, the bar plurality including longer support bars and shorter support bars. A first end of each longer support bar is connected to the enclosure lower part at the location where a lazytongs frame side is connected to an adjacent lazytongs frame side. A first end of each shorter support bar is connected to the enclosure lower part at a location intermediate the opposite sides of a lazytongs frame, a second opposite end of each longer support bar and a second opposite end of each shorter support bar being connected to a hub fitting about which all of the support bars radially array with the enclosure in erect condition. Means are provided for selectively adjusting the length of each longer support bar to one in a range of such lengths whereby a change of longer arm length produces in an erected condition enclosure, a changed enclosure plan expanse area and correspondingly changed enclosure volume. The shorter support bars are telescopic members which telescopically adjust in length responsive to change in an enclosure plan expanse area.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention relates to a structure readily erectable from a folded to erect condition wherein it presents an upright enclosure having one of a number of geometries such as triangular, rectangular etc and a floor so that the structure can be used for a variety of purposes involving reception therein of objects. It can, for example serve as a storage bin in a commercial establishment, be used at public events where quick and convenient setup and break down of a device of such character is favored. It can be adapted as a shopping cart with addition of wheels to the basic enclosure structure. The structure is readily handled and transported, and its manufacture can be effected with facility and economy.

Figure 1:
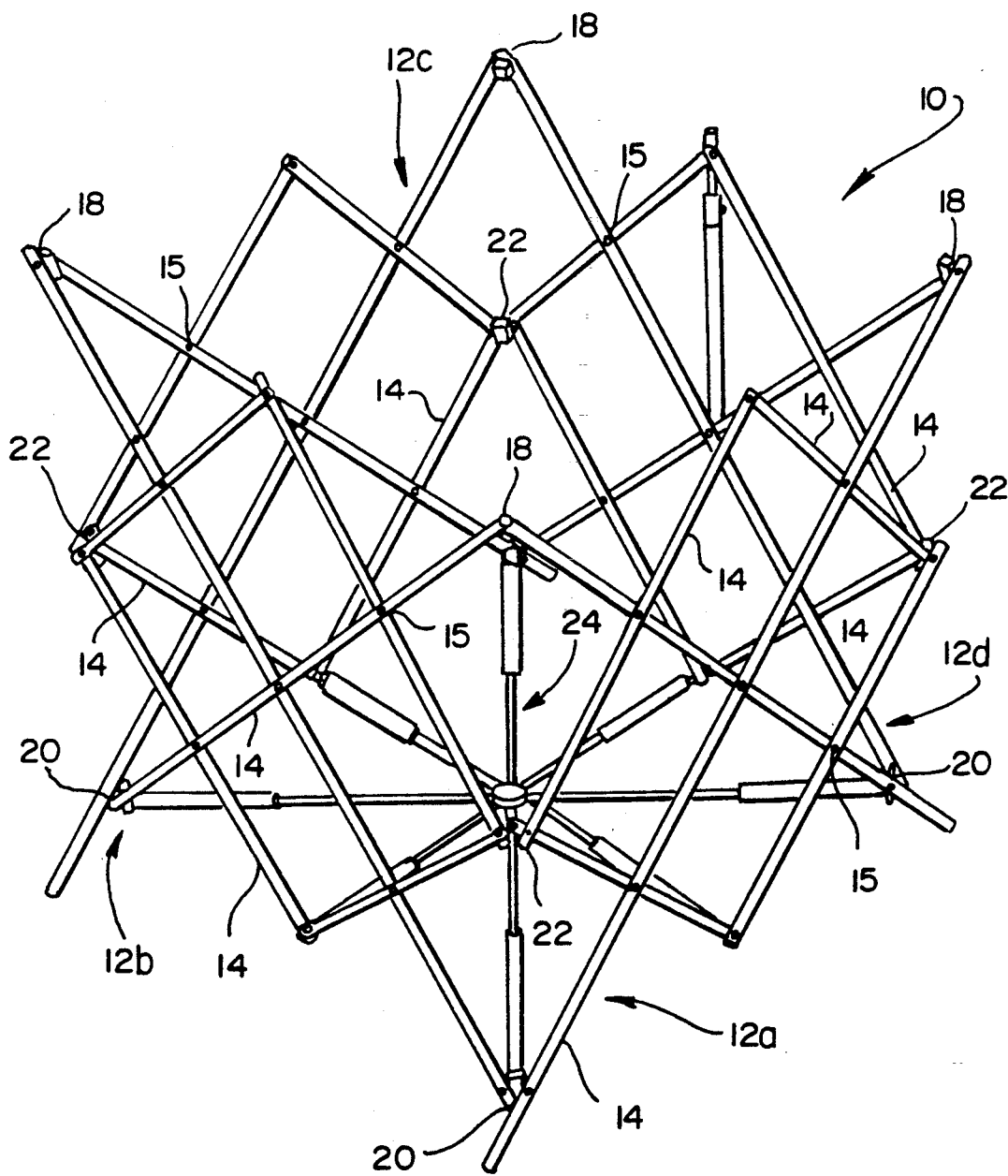
FIG. 1 is a perspective view of a readily collapsible readily erectable structure which can serve as a shopping basket and constructed in accordance with the principles of the present invention, the structure being in fully erect condition.

Referring now to FIG. 1, the structure 10 is shown in erect condition. That erect condition as provided by the invention, can as stated be one of several such erect geometries wherein the volume or capacity of the space enclosed with the enclosure varies and wherein the plan expanse area of the structure vary in correpsondence to the selected length to which the later described longer length support bars in the enclosure bottom have been set. By increasing length of these longer length support bars, the plan expanse area of the enclosure will increase as will the volume since change in volume will vary more in response to plan area change than to a structure height reduction that attends widening of the structure plan area.

Structure 10 is comprised of, e.g., four lazytongs frames 12a–12d, these frames in manner well known being comprised of a plurality of pivoted together arms 14, each depicted frame having six such arms. The lazytongs frames have retracted and extended positions and as known, in moving from retracted to extended positions these arms of a frame move in scissor-like fashion in a common plane. In the extended position, the frames 12a–12d each present an open panel or wall element which has opposite frame sides and a top and bottom expanse. The frames 12a–12d each are connected at a frame side to a frame side of an adjacent lazytongs frame.

Figure 4:
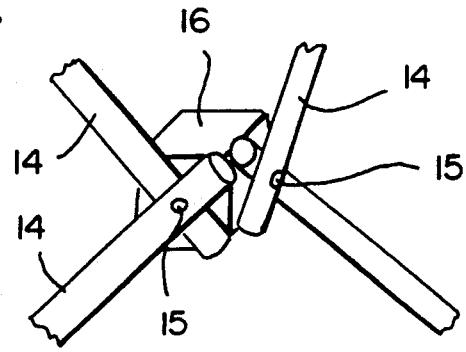
FIG. 4 is a fragmentary perspective view showing the manner in which a side of one lazytongs frame is connected to a side of an adjacent like frame with a pivot fitting at upper and intermediate height locations of the enclosure.

The connection of the frame sides is by pivoted connection as shown in FIG. 4. In addition to the arms 14 of each frame 12a–12d being pivoted to each other as at 15, these arms are pivoted to pivot fittings 16 at least two (top and bottom) but preferably at three locations, viz., at the enclosure top as at 18, at the bottom as at 20 and at a location intermediate the top and bottom as at 22, and as seen in FIG. 1. The pivot fittings 16 are illustrated by way of example as being cube-like. Other configurations of fitting can be used as long as same meet the need for pivoting two separate pairs of scissor acting arms thereto.

Figure 3:
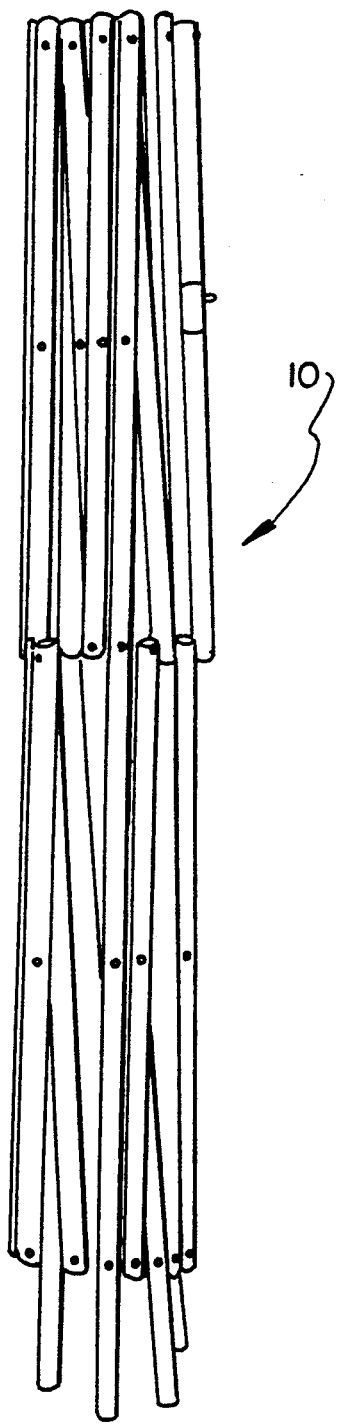
FIG. 3 is a side view of the structure in folded condition.

The arrangement of the lazytongs frame connection one to other is such that extending one such frame from the retracted position depicted in FIG. 3, results in the other such frames also extending, these frames in the case of a four-sided enclosure, each moving during extension in a plane that is orthogonal to the movement planes of the frames adjacent thereto. Where a different number of lazytongs frames make up the enclosure, the relative positioning of the lazytongs movement planes will be different.

It also is observed that erection of the lazytongs frames from retracted to extended position and hence, erection of the enclosure is possible with depressing of the after-described hub ring 34 to pivot support bars connecting same with the lazytongs frames at the bottom, this resulting in widening away of the scissors arms of the lazytongs and corresponding erection opening or widening of the folded enclosure structure.

With regard to the number of arms 14 shown present in each lazytongs frame 12a–12 as being six, this is by way of representation only. As one of ordinary skill in the art will recognize, a greater number of arms per frame can be used depending on how open the frame of the erect enclosure be. For example, if small articles are to be stored in an enclosure, such number of arms and arm width as will present openings in the erect structure smaller than the articles will be used.

Figure 2:
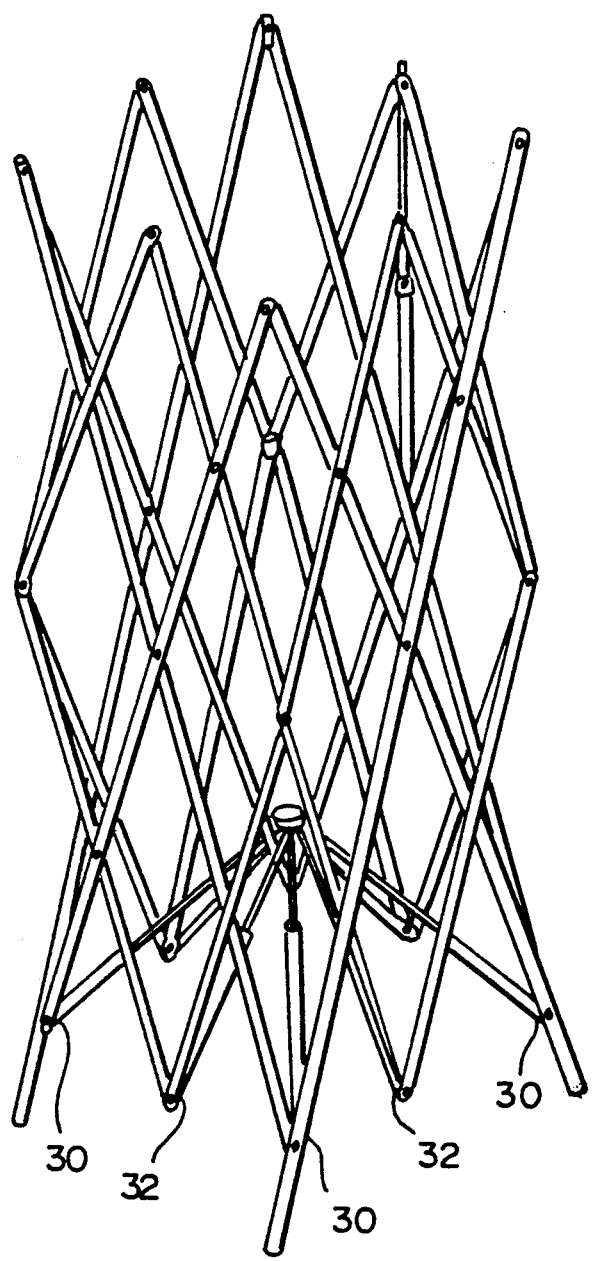
FIG. 2 is a perspective view of the structure depicted in FIG. 1, the structure being in an intermediate condition of erection.

The enclosure also has a floor shown generally at 24 in FIG. 1 wherein support bars constituting same are radially arrayed and dispose in a common plane, the support bars being disposed in an umbrella-like disposition when the structure is in partly erect condition as seen in FIG. 2. The support bars comprise longer support bars 26 and shorter support bars 28, the longer bars being connected at a first end of each to a lower part of the enclosure where one lazytongs frame is connected to another, this connection being as at 30 in FIG. 2. When the enclosure is erect, the said first ends of the bars 26 are connected at the bottom where corners of the enclosure are defined by meeting of sides of adjacent lazytongs frames.

The shorter support bars 28 are connected at a first end to a lazytongs frame at the bottom of the frame at a location intermediate the sides of the frame as at 32 (FIG. 2).

Figure 5:
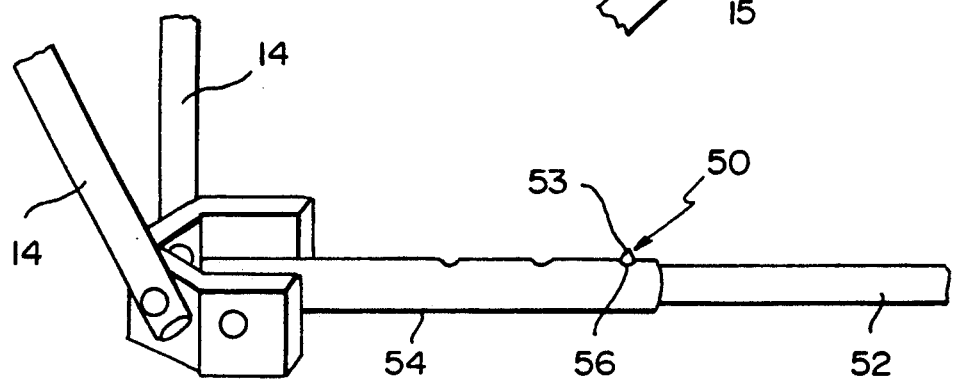
FIG. 5 is a fragmentary perspective view showing the manner in which a side of a lazytongs frame is connected to a side of an adjacent like frame at a lower part of the structure, the pivot fitting used for this purpose also serving for connection of an end of a long support bar thereto.
Figure 6:
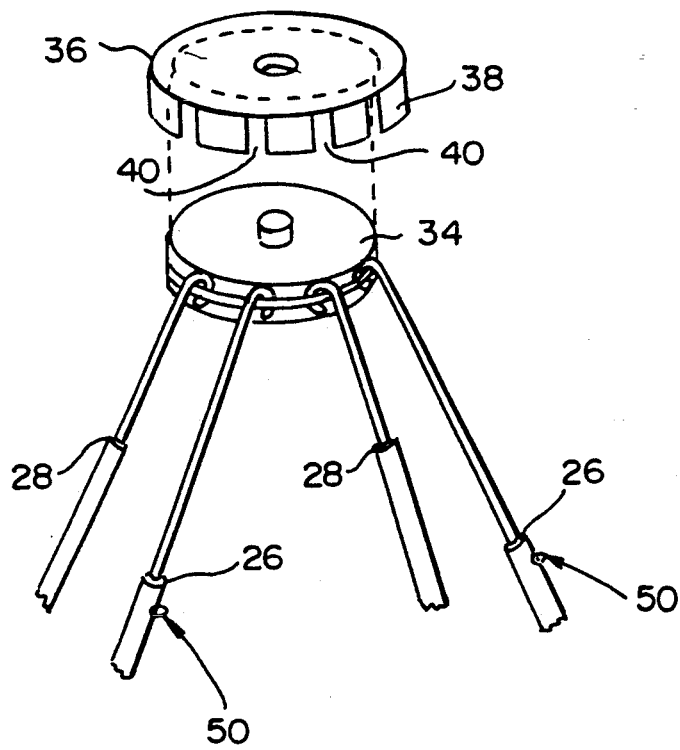
FIG. 6 is a fragmentary, partly exploded view showing the hub member to which ends of the support bars are connected with there being a hub cap depicted raised above the hub member on which it sits, the support bars being shown at a positioning thereof as exists when the structure is in partly folded condition.
Figure 8:
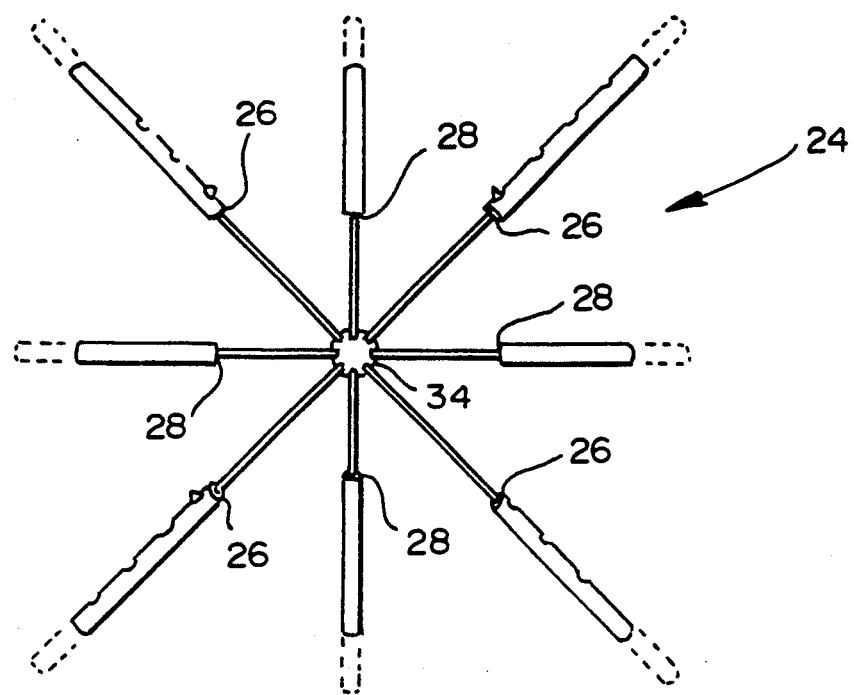
FIG. 8 is a plan view of the enclosure floor structure defined by the radial array of support bars when the structure is in an erect condition, the longer support bars being depicted in solid lines in a first selected length thereof, the lengthening of these longer support bars to a second selected position which provides for increased structure capacity being shown in dashed lines.

Opposite second ends of the support bars 26, 28 are connected to a hub ring 34 as shown generally in FIGS. 1, 2 and 8, and with more detail in FIG. 6. The connections of the support bars 26, 28 to the hub ring are pivoted ones seen best in FIG. 8. The first ends of the support bars 26, 28 also are pivot connected to the enclosure. In the case of the longer support bars 26, the pivot fitting 16 at the lower part of the enclosure to which frame sides of adjacent lazytongs frames are pivoted also will serve as the component for pivoting mounting of the longer support bars 26 as seen in FIG. 5.

Hub ring 34 can be covered with cap piece 36, this cap piece having a disc configuration with an axial flange 38 which is slotted as at 40 to accommodate reception of the longer and shorter length support bars 26, 28 when the structure is in erect condition. Length portions of these support bar proximal their connection to the hub ring will with the structure in erect condition, abut peripheral portions of the underface of the cap piece. This abutment contact aids in keeping the support bar array in a planar disposition under loading of items received in the enclosure.

In folded condition, the structure 10 is of compact unobtrusive configuration as seen from FIG. 3. It can for that reason be stored with convenience in a home, commercial establishment or vehicle. When it is needed to use same for given purpose, the user need only extend one lazytongs frame 12a-12d from retracted to extended position since extension of one such frame effects extension of all, although manipulating two such frames for that purpose also can be practiced.

In the structure erection movement, the lazytongs frame arms scissor and the frames widen and foreshorten from top to bottom, this being evident with reference to the intermediate erection position shown in FIG. 2. In undergoing that structure erection movedment, the support bars 26, 28 which were clustered together in a vertical disposition, move downwardly pivoting at both the frames and the hub ring. At full erection condition, the lazytongs frames present the rectangular or other geometric structure and the support bars radially arrayed as seen in FIG. 1, are in horizontal planar alignment.

The simplicity of erection and folding of the structure is evident from the above, and it is seen that such simplicity and the means by which same is accomplished is a feature of the invention.

In erect condition, the size of the rectangular enclosure is set by the length of the long support bars which for each is set and must be the same. Their lengths set the enclosure plan expanse area and hence volume or capacity value of the enclosure. The shorter support bars are spring loaded telescopic components and will automatically adjust to a length of each associated with particular enclosure plan expanse geometry parameters. The long support bars can be made to have the one length only, or they can be made to have a range of lengths and for the purpose as will be discussed below.

The capacity of the enclosure 10 can be changed if required to give it changed value. This is done by changing the length of the longer support bars 26 in manner as will be now described and with reference being made to FIGS. 5, 6 and 8. The lengths of the support bars are changed or selectively adjusted with detent means 50 embodied in the support bars 26 which support bars it is understood can comprise a rod part 52 and a tube part 54 in which the rod is slidable.

This detent means 50 can comprise, e.g., a bias loaded pin 54 carried in rod part 52 and a number of spaced openings 54 in the tube part 54. By relocating the pin to a selected same opening in each support bar 26, the bar length is changed to give greater or lesser length thereto. FIG. 6 shows a detented position of the pin in an opening that gives the least length valve, while FIG. 5 shows a detented arrangement giving longest arm length. FIG. 8 shows in dashed lines how the tube part is moved to a detented position wherein the length of bars 26 is increased.

Figure 7:
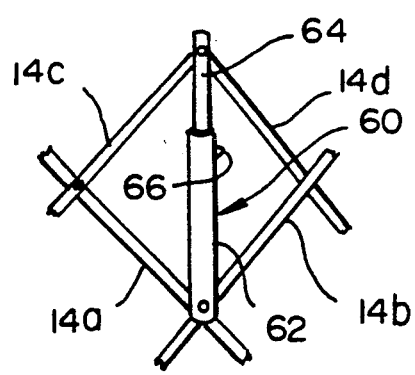
FIG. 7 is a fragmentary elevational view showing a lock member carried on one of the lazytongs frames and used to lock the enclosure in erect condition.

FIG. 7 illustrates a locking unit 60 which can be used for locking the enclosure in an erect condition—it also can be used to lock the enclosure in folded condition. The unit 60 can be a telescopic strut having a sleeve 62 connected to arms 14a, 14b of a lazytongs frame and a rod 64 movable in the sleeve 62 which is connected to other arm 14c, 14d of the same frame. A set screw 66 or like member carried in the sleeve can be used to set the rod 62 locked and hence, the frame arm relation.

Figure 9:
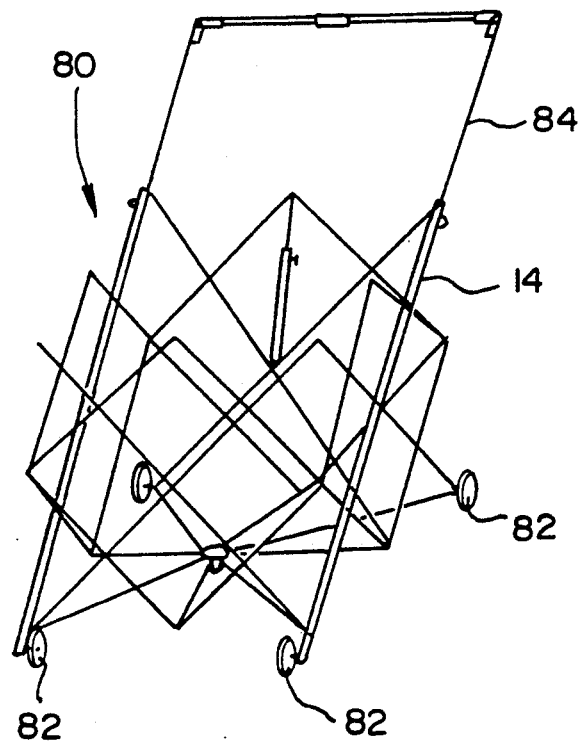
FIG. 9 is a perspective view of the erect condition structure as adapted to a shopping cart fitted with support wheels and handle.

FIG. 9 illustrates how the enclosure can be adapted as a shopping cart 80. The enclosure structure can be fitted with wheels 82 at the bottom ends lazytongs frame arms. In addition, a handle element can be received slidably in a frame arm and be extended from a housed to extended position as shown to serve as the handle with which the enclosure can be wheeled and otherwise maneuvered.

Figure 10A:
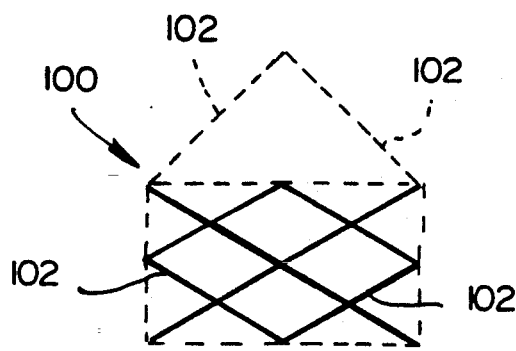
FIG. 10A is a schematic showing of an erected structure having three sides.
Figure 10B:
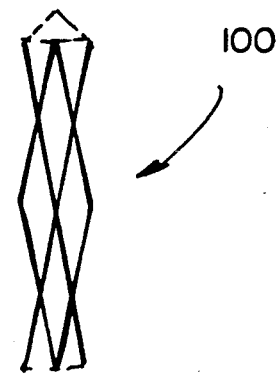
FIG. 10B depicts this structure in folded condition.
Figure 13:
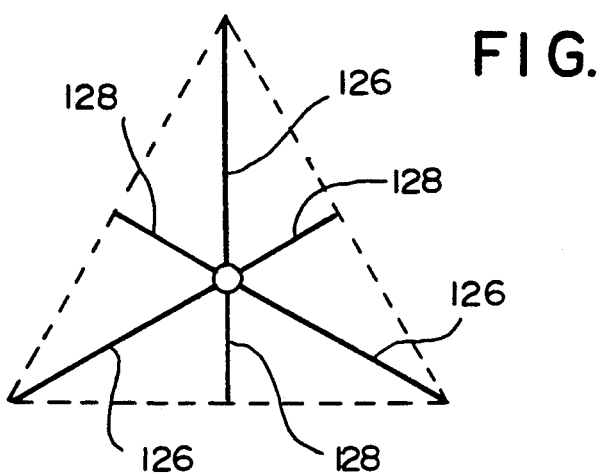
FIG. 13 is a plan view of the floor structure of a three-sided structure when same is erected.

As noted above, the erected structure geometry can be of various configurations in addition to the rectangular one given by way of example. Another enclosure geometry is shown in FIG. 10A where structure 100 shown in schematic detail will have three lazytongs frames 102, two such frames being indicated by the dashed lines which dashed lines it will be noted portray the envelope of the erect structure. These frames will be connected together in the same manner as earlier described. FIG. 13 shows how the floor defining support bars 126, 128 appear with the structure erect, it being seen that a tree-sided structure has three longer support bars 126, and three shorter support bars 128 so that for a given enclosure shape, there will be as many longer support bars and as many shorter support bars as there are enclosure sides.

Figure 11A:
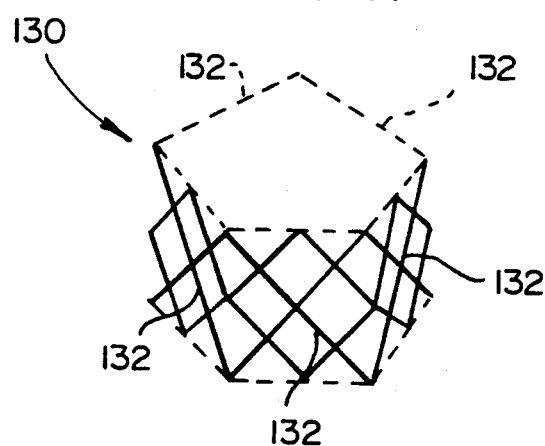
FIG. 11A is a schematic showing of an erected structure with five sides.
Figure 11B:
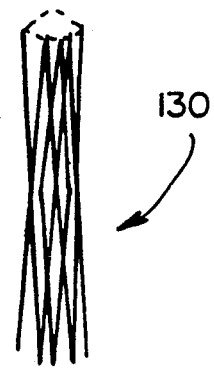
FIG. 11B depicts same when in folded condition.
Figure 14:
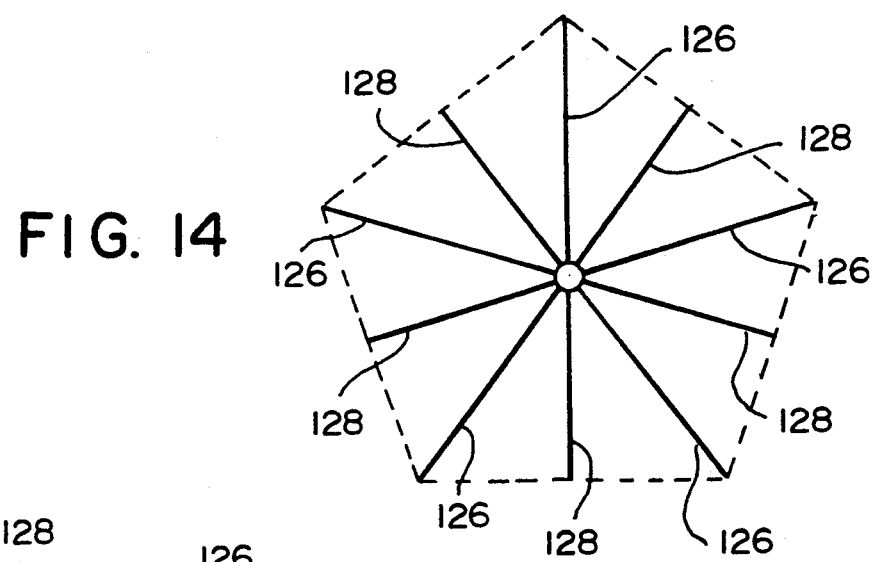
FIG. 14 is a plan view of the floor structure of an erect five-sided structure.

FIG. 11A shows a five-sided, erect condition enclosure 130 having five sides defined by five lazytongs frames 132, the envelope of this structure being that of a hollow pentagon configured structure. Its folded condition is shown in FIG. 11B, and the longer support arm 126—shorter support arm 128 array associated there-with being seen in FIG. 14, the lazytongs frames being depicted in dashed lines in that Figure.

Figure 12A:
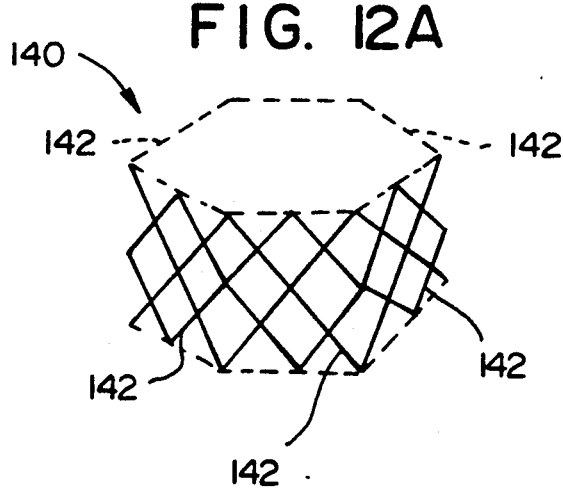
FIG. 12A is a schematic showing of an erected six-sided structure.
Figure 12B:
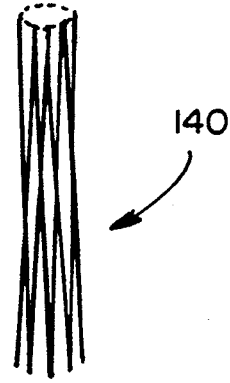
FIG. 12B depicts its folded condition.
Figure 15:
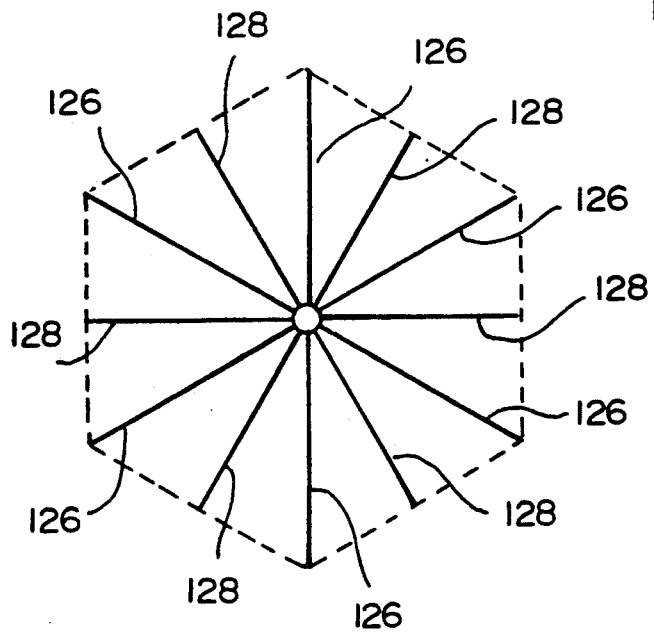
FIG. 15 is a plan view of the floor structure support bar array of a six-sided structure.

A six-sided or hexagon shaped structure 140 is shown erect in FIG. 12A and folded in FIG. 12B. It has six lazytongs frames 142 and FIG. 15 shows the longer—shorter support arm array 126, 128 associated with an erect such structure.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A structure erectable from a folded condition thereof to an erected condition wherein the structure presents an upright enclosure having a plurality of planar sides, and a floor supported from a lower part of the enclosure, the structure comprising a corresponding plurality of lazytongs frames connected each at both of opposite frame sides to another one of said lazytongs frames so that extension of any one lazytongs frame from a retracted to extended position causes extension of the other lazytongs frames, the extended lazytongs frames defining the enclosure, the floor comprising a plurality of support bars, the bar plurality including longer support bars and shorter support bars, a first end of each longer support bar being connected to the enclosure lower part at the location where a lazytongs frame side is connected to an adjacent lazytongs frame side, a first end of each shorter support bar being connected to the enclosure lower part at a location intermediate the opposite sides of a lazytongs frame, a second opposite end of each longer support bar and a second opposite end of each shorter support bar being connected to a hub fitting about which all of the support bars radially array with the enclosure in erect condition, the shorter support bars being telescopic members which telescopically adjust in length during folding and erection of the enclosure, the plan expanse of the enclosure in erect condition being set by a predetermined length of the longer support bars.

2. A structure in accordance with claim 1 in which the lazytongs frames are connected at the opposite sides of each to a side of an adjacently placed frame by pivoting of each on a pivot fitting.

3. A structure in accordance with claim 1 in which the lazytongs frames are connected at the opposite sides of each to a side of an adjacently placed frame at upper and lower locations on each side and at least one location intermediate said upper and lower locations by pivoted connections.

4. A structure in accordance with claim 3 in which the pivoted connections include pivot fittings, the arms of the frame members being pivoted to said pivot fittings.

5. A structure in accordance with claim 3 in which connection of the common ends of the support bars to the lower part of the frames is by pivoting of said ends to said frames.

6. A structure in accordance with claim 1 in which the hub fitting includes a ring to which the support arm opposite ends are connected, and a laterally widened cap piece overlaying the ring, the cap piece with the structure erected being closely engaged at an underside thereof by a length part of each of said support arms with the structure in erect condition whereby a deflection of the supporting arms from a predetermined array planar disposition is prevented.

7. A structure in accordance with claim 1 further comprising means for locking the structure in erect condition.

8. A structure in accordance with claim 7 in which the locking means comprises a locking unit carried on arms of at least one of the lazytongs frames and operable to lock some arms of that frame in fixed relation to other arms whereby frame arm movement and correspondingly that of the structure is prevented.

9. A structure in accordance with claim 8 in which the lock unit comprises a telescopic strut secured at a first end thereof to the first-mentioned frame arms, an opposite end of the strut being secured to the said frame other arms, the strut including a rod movable in a sleeve, there being a detect to lock the rod at selected locations in the sleeve.

10. A structure in accordance with claim 1 further comprising means for selectively adjusting the length of each longer support bar to one in a range of such lengths whereby a change of longer bar length produces in an erected condition enclosure a changed enclosure plan expanse area and correspondingly changed enclosure volume, the shorter support bars being telescopic members with telescopically adjust in length responsive to change in said enclosure plan expanse area.

11. A structure in accordance with claim 10 in which each longer support bar comprises a rod and a tubular piece slidable on the rod to vary effective longer support bar length, the means for selectively adjusting the longer support arm length including cooperating detent means carried on the longer support arm rod and tubular piece to lock the two at a selected effective length.

12. A structure in accordance with claim 11 in which the detent means comprises a bias urged element on one of the rod and tubular piece, and a plurality of openings carried in the other of said rod and tubular piece and receptive of the bias urged element.

13. A structure in accordance with claim 1 in which the number of plural sides of the enclosure and the corresponding plurality of lazytongs frames is 3 or more.

14. A structure in accordance with claim 13 in which the number of longer support bars in the plurality of support bars is the same as the number of structure sides in the plurality.

15. A structure in accordance with claim 13 in which the number of shorter support bars in the plurality of support bars is the same as the number of structure sides in the plurality.

16. A structure erectable from a folded condition thereof to an erected condition wherein the structure presents an upright rectangular enclosure and a floor supported from a lower part of the enclosure, the structure comprising four lazytongs frames connected each at both of opposite frame sides to another one of said lazytongs frames so that extension of any one lazytongs frame from a retracted to extended position causes extension of the other lazytongs frames, the extended lazytongs frames defining the enclosure, the floor comprising a plurality of support bars, the bar plurality including longer support bars and shorter support bars, a first end of each longer support bar being connected to the enclosure lower part at the location where a lazytongs frame side is connected to an adjacent lazytongs frame side, a first end of each shorter support bar being connected to the enclosure lower part at a location intermediate the opposite sides of a lazytongs frame, a second opposite end of each longer support bar and a second opposite end of each shorter support bar being connected to a hub fitting about which all of the support arms radially array with the enclosure in erect condition, and means for selectively adjusting the length of each longer support arm to a predetermined one in a range of such lengths whereby a change of longer arm length produces in an erected condition enclosure a changed enclosure plan expanse area and correspondingly changed enclosure volume, the shorter support arms being telescopic members which telescopically adjust in length responsive to change in said enclosure plan expanse area.

17. A structure in accordance with claim 1 further comprising wheels carried on a lower portion of at least an opposed pair of lazytongs frames.

18. A structure in accordance with claim 1 in which the lazytongs frames each are comprised of a plurality of frame arms, said frame arms being pivoted to each of others, the structure including a handle connected to companion ones of the frame arms of an opposed pair of lazytongs frames.

19. A structure in accordance with claim 14 in which the handle includes handle arms telescopically receivable in the companion ones of the frame arms of the opposed pair of lazytongs frames.

* * * * *